United States Patent [19]

Yamamoto et al.

[11] Patent Number: 4,816,917
[45] Date of Patent: Mar. 28, 1989

[54] CLAMP CIRCUIT FOR A SOLID-STATE IMAGE DEVICE

[75] Inventors: Isamu Yamamoto; Takashi Asaida, both of Kanagawa, Japan

[73] Assignee: Sony Corporation, Tokyo, Japan

[21] Appl. No.: 163,720

[22] Filed: Mar. 3, 1988

[30] Foreign Application Priority Data

Mar. 4, 1987 [JP] Japan .................................. 62-49810

[51] Int. Cl.[4] .......................... H04N 3/14; H04N 5/18
[52] U.S. Cl. ................................ 358/213.16; 358/172; 358/213.15; 358/221
[58] Field of Search ... 358/221, 213.16, 213.18.213.15, 358/163, 172

[56] References Cited

U.S. PATENT DOCUMENTS

| | | | |
|---|---|---|---|
| 4,498,105 | 2/1985 | Crawshaw | 358/221 |
| 4,514,762 | 4/1985 | van Gompel | 358/221 |
| 4,553,169 | 11/1985 | Yoshioka et al. | 358/213.16 |
| 4,589,025 | 5/1986 | Monahan et al. | 358/221 |
| 4,707,741 | 11/1987 | Stratton | 358/172 |

Primary Examiner—Jin F. Ng
Assistant Examiner—Stephen Brinich

[57] ABSTRACT

A clamp circuit for a solid-state imaging device which includes a clamp circuit for clamping at a black reference voltage level a video signal at a signal level which is obtained when an optical black portion formed on the solid-state imaging device is read, a detection circuit for detecting the increase in voltage of the optical black portion, a circuit for interrupting vertical transfer clock signals of the solid-state imaging device during at least one horizontal line interval during a vertical blanking period, and a switching circuit which when the detection means detects an abnormal voltage of the optical black portion, supplies a clamp pulse which is generated with a timing associated with the interruption of the transfer clock signals instead of the clamp pulse of the optical black portion.

A circuit for detecting a voltage abnormality of the optical black portion provided to an imaging surface, and a circuit for interrupting the vertical transfer clock signals during at least one horizontal line period in the vertical blanking period are connected in the clamp circuit of the solid-state imaging device and when an abnormally high voltage is generated at the optical black portion, a video signal portion which is cleared upon interruption of the transfer clock signals is overincidence state, is prevented.

4 Claims, 6 Drawing Sheets

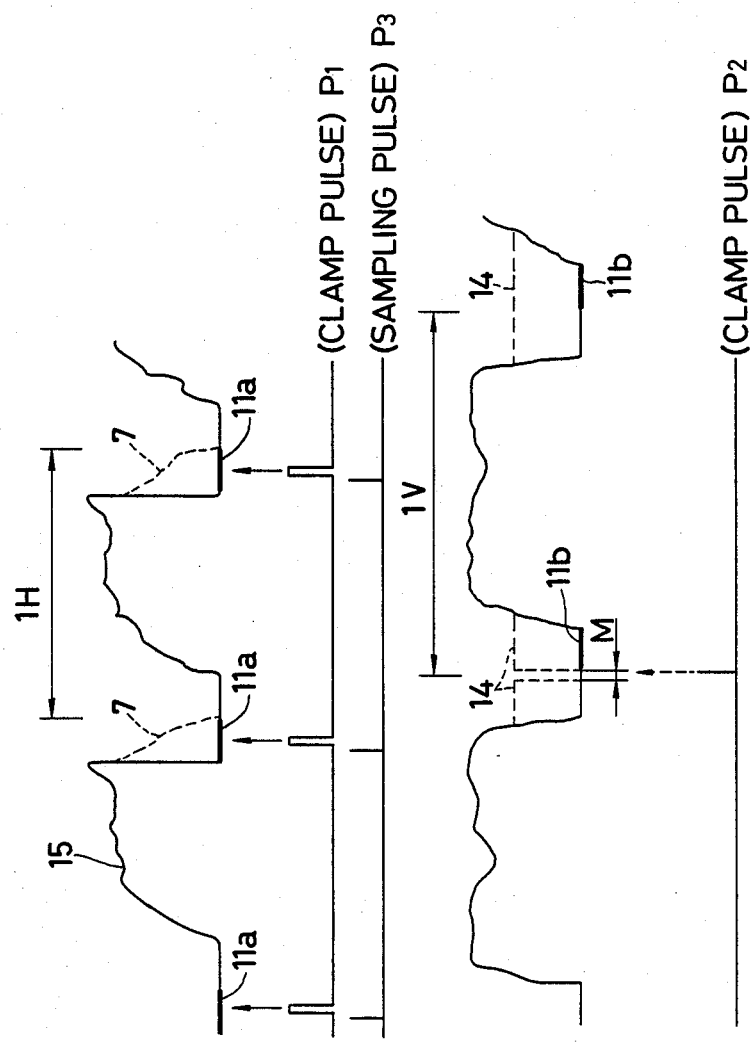

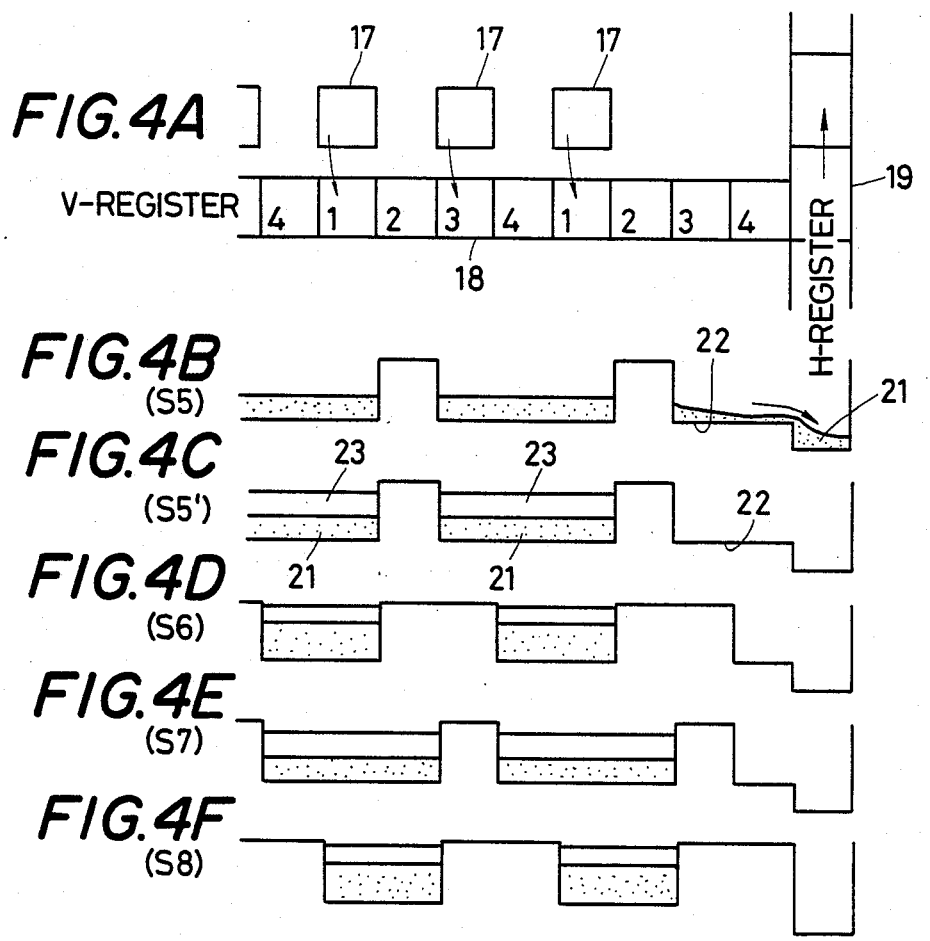

FIG. 5A
V-TRANSFER ELEMENTS ① 2 ③ 4 ① 2 ③ 4
FIG. 5B (S0)
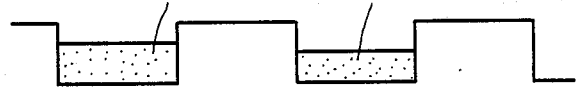
FIG. 5C (S1)
FIG. 5D (S2)
FIG. 5E (S3)
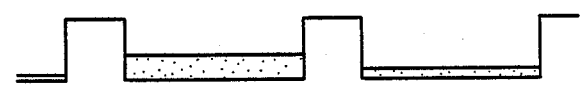
FIG. 5F (S4)
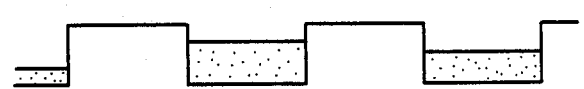
FIG. 5G (S5)
FIG. 5H (S6)
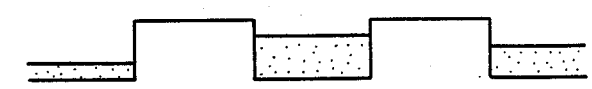
FIG. 5I (S7)
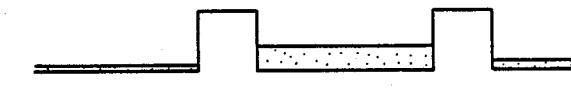
FIG. 5J (S8)=S0
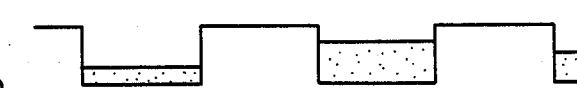

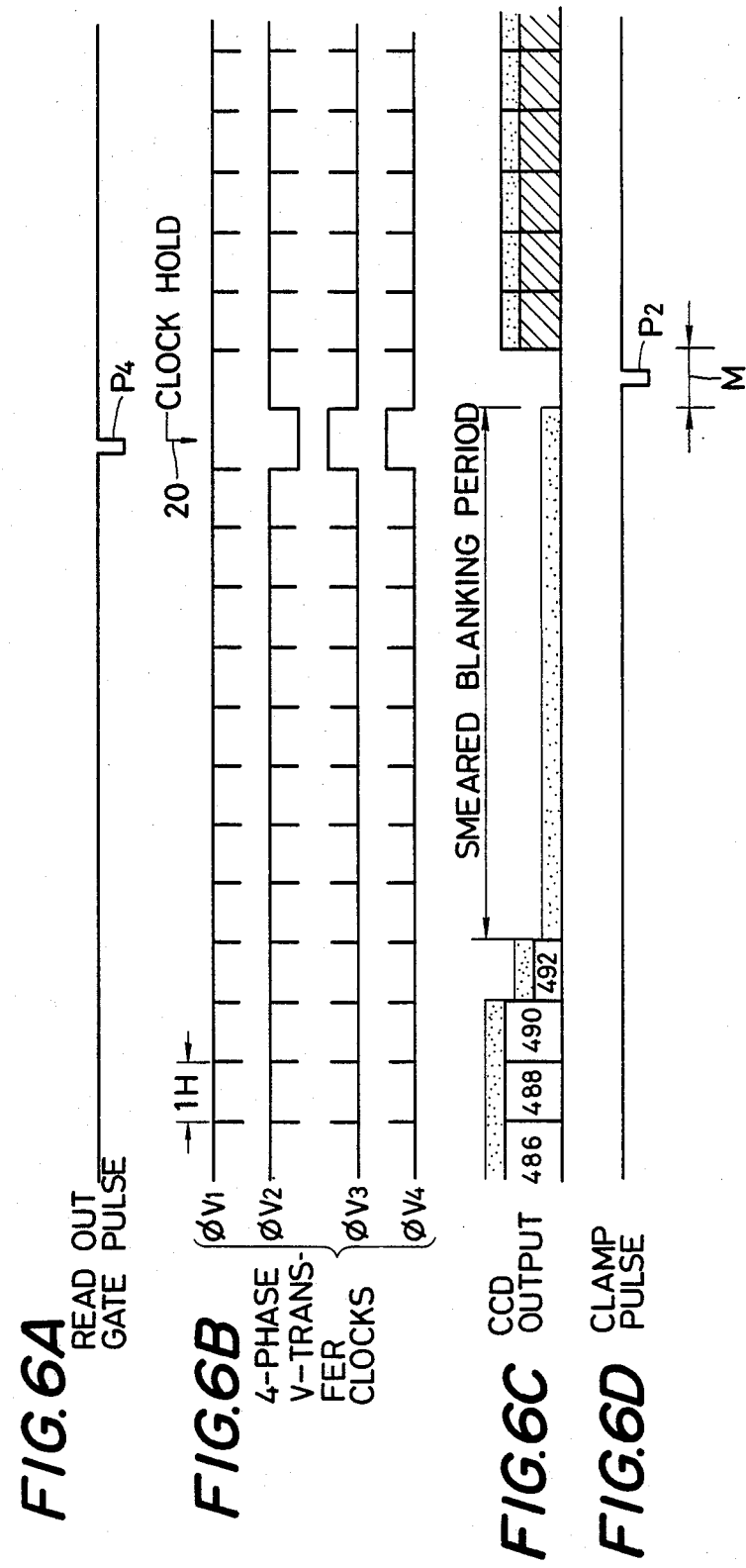

F/G.7
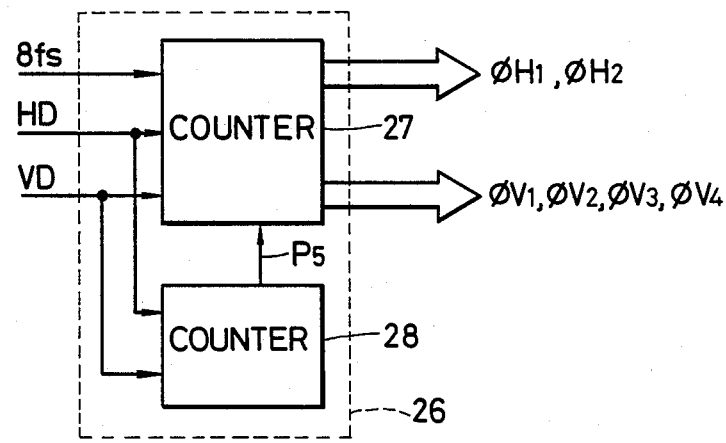

CLAMP CIRCUIT FOR A SOLID-STATE IMAGE DEVICE

BACKGROUND OF THE INVENTION

1. Field of the Invention

The present invention relates to a clamp circuit for a solid-state imaging device and, more particularly, to a clamp circuit which clamps a reference black level in a video signal, at a signal level which is obtained when an optical black portion is read.

2. Description of the Prior Art

In a solid-state imaging device such as a CCD, a reference black level is set so that an output video signal always has a brightness which corresponds to the reference black level. As shown in U.S. Pat. No. 3,806,729 which issued on Apr. 23, 1974 to J. M. Caywood, in order to obtain the reference black level, an optical black light-shielded portion is formed outside of an effective scan area of an imaging surface. The level of video signal obtained when the optical black portion is scanned is used as the reference level to indicate a black reference level in the video signal.

When the reference black level is clamped as described above, if light energy is overincident on the imaging surface, then mis-clamping occurs. More specifically, if an emitter such as the sun, a lamp, or the like emits high intensity light relatively near the optical black portion, such light leaks around the object. Some of such leaking light energy is incident below the optical black portion, and is photoelectrically converted into an electrical signal. If such phenomenon occurs, the level of the video signal obtained when the optical black portion is scanned drifts from a level corresponding to a reference black, which results in the occurance of mis-clamping.

SUMMARY OF THE INVENTION

The present invention has been made to solve this problem and has an object to provide a clamp circuit which is free from mis-clamping when overincidence occurs on the imaging surface.

A clamp circuit for a solid-state imaging device according to the present invention comprises: a clamp circuit for clamping at a black reference voltage level of a video signal by using a signal level which is obtained when an optical black portion formed in the solid-state imaging device is read. A detection means detects an increase in the voltage of the optical black portion and a counter means interrupts the vertical transfer clocks of the solid-state imaging device during at least a 1H line interval during a vertical blanking period. A switching means operates when the detection means detects an abnormal voltage of the optical black portion so as to supply a clamp pulse which is generated during a timing that is associated with the interruption of the transfer clocks instead of the conventional clamp pulse for the optical black portion.

When interruption of the transfer of a vertical transfer register occurs, the contents of a horizontal transfer register is cleared. During an overincidence state, a video signal portion of the output from the transfer register in which no excessive charges remain is clamped.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIGS. 3A to 3E are waveforms of a video signal which is output from the CCD and of clamp pulses;

FIGS. 4A to 4F are views for explaining the invention and the transfer operation of a transfer register of the CCD;

FIGS. 5A to 5J are views showing potential transitions in each transfer element during a transfer operation of the vertical transfer register for one cycle;

FIGS. 6A to 6D are timing charts showing the timings for holding the transfer clocks of the vertical transfer register;

FIG. 7 is a block diagram of a transfer clock generator.

DESCRIPTION OF THE PREFERRED EMBODIMENTS

Figure 1:
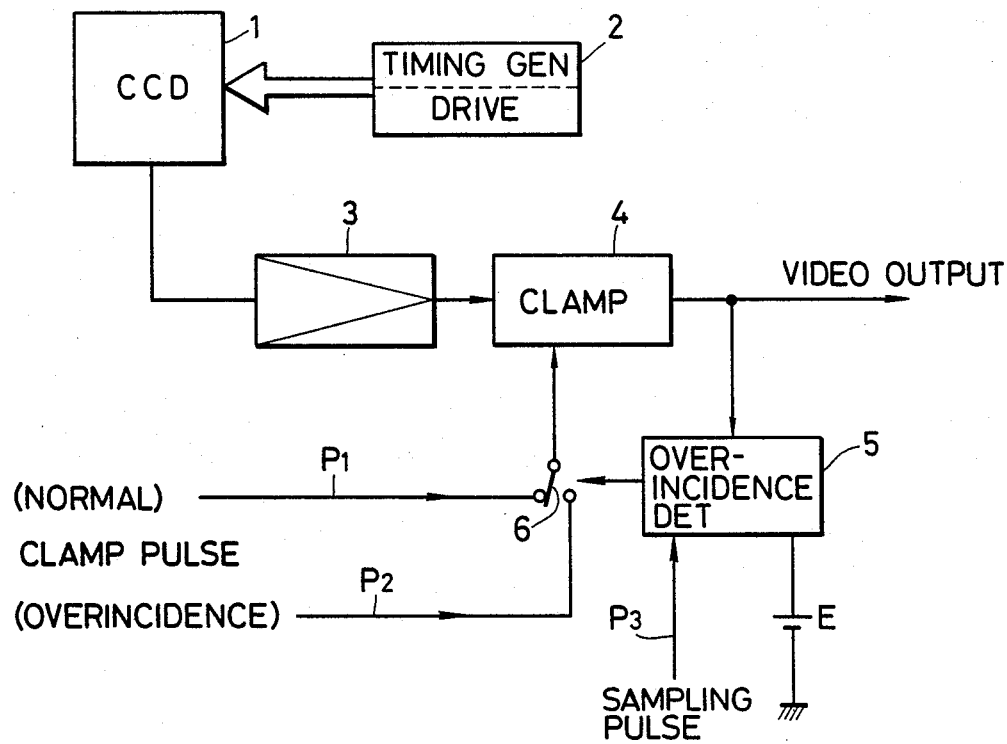
FIG. 1 is a block diagram of a clamp circuit for a CCD according to an embodiment of the present invention.
Figure 2:
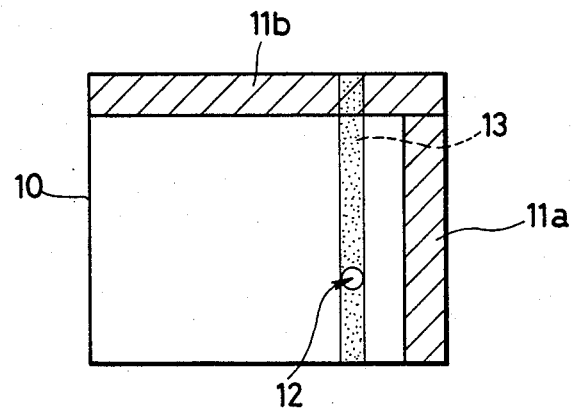
FIG. 2 is a front view of an imaging surface of the CCD.

FIG. 1 is a block diagram which shows a clamp circuit for a solid-state imaging device according to an embodiment of the present invention. The solid-state imaging device is a CCD 1 which has optical black portions (11a, 11b) formed on the right and upper end portions of an imaging surface 10 as shown in FIG. 2. The optical black portions (11a, 11b) provide shields for incident light so as to provide portions where no charges are induced by incidence light so as to thereby obtain a black level.

The CCD 1 performs horizontal and vertical transfer operations under the control of a driving section 2 which comprises a timing generator and a drive. The driving section 2 has an output which is a video signal which corresponds to incident light on the imaging surface 10. The output video signal from the CCD is amplified by a preamplifier 3, and is supplied as input to a clamp circuit 4.

The clamp circuit 4 normally receives clamp pulses $P_1$ which are shown in FIG. 3B through a switch 6. Circuit 4 clamps a part of the optical black portion 11a which is indicated by a heavy line of the video output which is shown in FIG. 3A as a reference black level during a horizontal scanning period.

The output from the clamp circuit 4 is supplied as the video output signal, and is also supplied to an overincidence detector 5. The overincidence detector 5 also receives sampling pulses $P_3$ which are shown in FIG. 3C, and the voltage level of the video output which corresponds to the optical black portion 11a which immediately precedes the clamp pulse $P_1$ is compared with the level of a reference voltage E. If the output voltage corresponding to the optical black portion 11a exceeds the reference voltage E, the switch 6 is switched in response to the detected output so that the clamp pulse $P_2$ shown in FIG. 3E is supplied to the clamp circuit 4.

If overincidence occurs, as indicated by a spot 12 in FIG. 2, a linear smear 13 is generated in the vertical direction. Such smear is described in detail in U.S. Pat. No. 4,010,319 which issued on Mar. 1, 1977 to P. A.

Levine. When the spot 12 is located near the optical black portion 11a, strong light leaks occur below the optical black portion 11a, and an erroneous voltage 7 corresponding to the leaked light is generated which is indicated by the dotted line in FIG. 3A. If this portion is clamped by the clamp circuit 4, a correct reference black level will not be clamped.

For this reason, when a CCD which has an optical black portion 11b in the vertical blanking period as shown in FIG. 2, the optical black portion 11a during the horizontal blanking period will normally be clamped in response to the clamp pulse $P_1$, and will be used as the black level. When the erroneous voltage 7 is generated, the clamp pulse $P_2$ for clamping the optical black portion 11b during the vertical blanking period may be supplied to the clamp circuit 4.

As described above, if light which has an intensity which is enough to generate an erroneous voltage 7 is incident on the imaging surface 10, smear 13 will normally be generated. More specifically, as shown in FIG. 3D, a smear voltage 14 is generated during the vertical blanking period. Therefore, the voltage during the vertical blanking period cannot be clamped and used as the black level.

When a CCD is operated according to broadcast standards, 20H during the vertical blanking period will be normally idle-transferred. Thus, unnecessary charges can be swept out during such time. The present inventors discovered that an interesting phenomenon occurred by holding an operation clock of a vertical register of the CCD in a clock supply state during the vertical blanking period, and causing the horizontal transfer register of the CCD to perform two, i.e., 2H transfer operations during such clock-holding. More specifically, smeared charges in the horizontal transfer register are swept out by the first transfer operation, and charges left in the horizontal transfer register are shifted out by the following second transfer operation. These latter charges are similar to a dark current, i.e., a black level. Thus, the latter charges are used to determine the black level when a normal black level cannot be used The present invention is described in detail below.

The CCD 1 is of an interline transfer type, and comprises a vertical transfer register 18 (V register) and a horizontal transfer register 19 (H register), as shown in FIG. 4A. Charges which are detected by photosensor elements 17 are read out into the first and third transfer elements of the V register 18 through a gate (not shown) at a timing which corresponds to a readout gate pulse $P_4$ which is shown in FIG. 6A, during the vertical blanking period. Then, charges which are read in response to four-phase vertical transfer clocks signals $V_1$ to $V_4$ are transferred into the H register 19. Eight four-phase vertical transfer clocks are supplied for each horizontal blanking period. Note that in FIG. 6B, one of the eight clocks is shown in each horizontal blanking period. Potential wells which are indicated by S0 to S7 in FIGS. 5B to 5J are sequentially formed in the V register 18, so that video charges 23 are sequentially transferred for each horizontal line. The video charges transferred to the H register 19 are transferred in response to a pixel clock fs, and video signals which correspond to lines 486, 488, ... are sequentially output, as shown in FIG. 6C.

In this embodiment of the transfer timings S0 to S7 which are shown in FIGS. 5B to 5J, a transfer clock for the V register 18 is held at the fifth transfer timing S5. More specifically, during a horizontal period which is indicated by an arrow 20 in FIG. 6B, after five transfer clocks are supplied during the last horizontal blanking period, the voltages of the transfer clocks $V_1$ to $V_4$ are respectively fixed at HIGH, LOW, HIGH, and HIGH levels, and thus a fifth potential state S5 shown in FIG. 5G is held.

As shown in detail in FIGS. 4B to 4F, if the V register is held in the potential state S5, smeared charges 21 in the potential wells 22 which correspond to the preceding third and fourth transfer elements in the transfer direction are swept out to the H register 19. On the other hand, since the H register 19 continues the transfer operation, it produces outputs which include all of the read smeared charges 21.

In the potential state S5 shown in FIG. 4B, the video charges 23 including the smeared charges 21 from the photosensor elements 17 are read by the V register 18 in response to the readout gate pulse P4, which is shown by curve S5' in FIG. 4C. However, since the third transfer element at the end of V register has no corresponding photosensor element 17, this portion is not smeared again.

In this manner, after clocks are held during a 1H line interval, such holding is cancelled at the trailing edge of the hold interval, as shown in FIG. 6B, and a normal transfer operation of the V register 19 is restarted as indicated by curves S6, S7 and S8 in FIGS. 4D to 4F.

During the 1H line interval immediately after the transfer operation of the V register 18 has been interrupted, no charges which are to be transferred are left in the H register 19, i.e., a non-signal interval which is indicated by interval M in FIG. 6D occurs. During the non-signal interval M, the clamp pulse $P_2$ during the overincidence state is supplied to the clamp circuit 4, and a voltage level during this interval is clamped as the reference black level instead of the optical black portion 11.

FIG. 7 shows a transfer clock generator 26. The clock generator 26 comprises counters 27 and 28. One counter 27 counts the clock signals 8fs which have a frequency of eight times that of an image sampling clock fs, and generates two-phase horizontal transfer clock signals $H_1$ and $H_2$. The counter 27 receives horizontal and vertical sync signals HD and VD, and generates four-phase vertical transfer clocks signals $V_1$ to $V_4$ each of which have eight pulses. The other counter 28 counts the horizontal sync signal HD, and outputs a transfer interrupt pulse $P_5$ once per frame during a predetermined 1H line interval in the vertical blanking period upon reception of the vertical sync signal VD. In response to the pulse $P_5$, the counter 27 interrupts its counting of the vertical transfer clocks $V_1$ to $V_4$, and holds their signal levels.

The start timing of the vertical transfer interruption need not be the fifth timing shown in FIG. 4 but may be any of the sixth to eighth timings. The duration of the vertical transfer interruption can extend over one horizontal scanning period. In that case, if the duration of the transfer interruption has passed over one line, smeared charges in the H register 19 are swept out. Therefore, clamping can be performed at a proper timing even during vertical transfer interruption, such that the non-signal output portion can be clamped as the reference black level.

According to the present invention as described above, when the video output level of the optical black portion exceeds the reference level, the content of the H register is cleared during a vertical transfer interruption interval in the vertical blanking period, and a cleared video signal is clamped. Therefore, if an abnormal voltage is generated in the optical black portion due to overincidence, mis-clamping does not occur, and the reference black level of the video output can be kept stable, so as to obtain a high-quality image.

Although the invention has been described with respect to preferred embodiments, it is not to be so limited as changes and modifications can be made which are within the full intended scope of the invention as defined by the appended claims.

We claim as our invention:

1. A clamp circuit for a video camera which has a solid-state imaging element which has an optical black portion so as to shield incident light at its peripheral portion, and the clamp circuit clamps the signal level of the optical black portion at a reference black level of a video signal, comprising:
   a first clamp pulse generating means for generating a first clamp pulse which occurs at least once in a horizontal blanking period and during an interval corresponding to said signal level of the optical black portion;
   a second clamp pulse generating means for generating a second clamp pulse which occurs in a vertical blanking period;
   a detector means which receives and compares the signal level of the optical black portion with a predetermined reference voltage, and produces an output selection signal in accordance to whether said signal level of the optical black portion exceeds said predetermined voltage;
   a selection means which receives said selection signal from said detector and selects either one of said first and second clamp pulses according to said selection signal;
   a clamp means which receives the output of said solid-state imaging element and clamping a voltage of the optical black portion of the video signal in response to the clamp pulse selected by said selection means; and
   a drive means generating vertical and horizontal transfer clocks which are supplied to said solid-state imaging element for performing charge transfers in said solid-state imaging element, and said drive means further including clock hold means for holding the vertical transfer clock during at least one horizontal scanning period during the vertical blanking period, and said clamp means clamping charges generated during the clock hold interval in response to said second clamp pulse so as to obtain a reference black signal level.

2. A clamp circuit according to claim 1, wherein the vertical transfer clock produces four-phase clock signals and said clock hold means sets at least three clock phases of said four-phase clock signals in a hold state during one horizontal scanning period.

3. A clamp circuit according to claim 2, wherein said drive means receives a clock signal which has a frequency of eight times a sampling clock signal, and vertical and horizontal sync signals, and generates the vertical and horizontal transfer clock signals so that they are phase-locked with the sampling clock signal and the vertical and horizontal sync signals.

4. A clamp circuit according to claim 3, wherein said clock hold means includes a counter, and said counter counts the vertical and horizontal sync signals and generate a signal for holding the vertical transfer clock signal at least once per frame.

* * * * *